Figure 1:
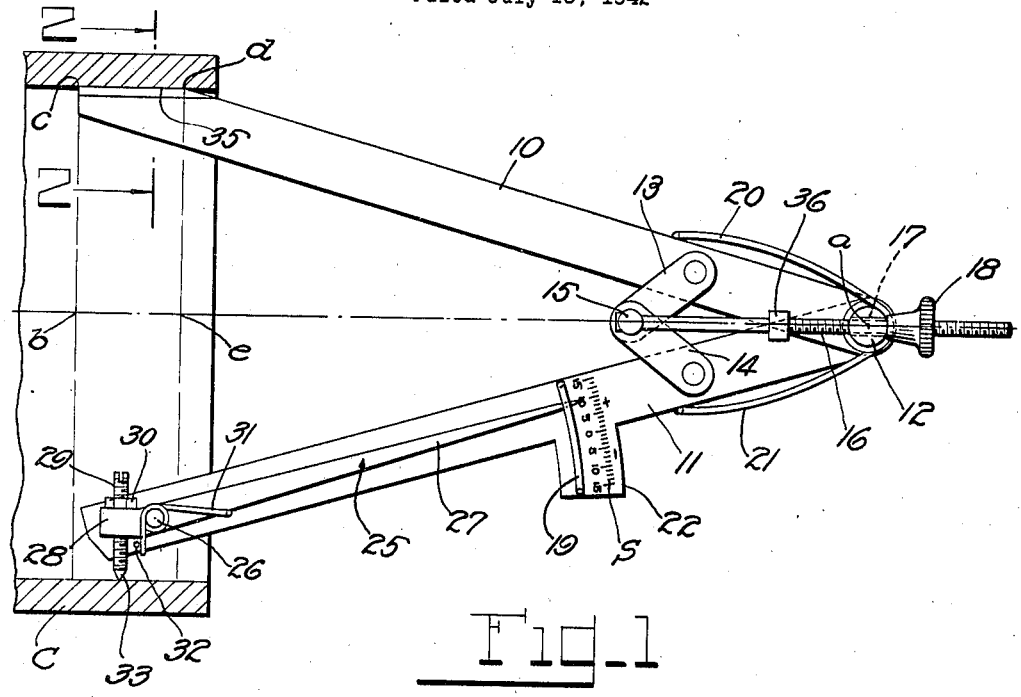

Oct. 19, 1943.  A. B. PIKE  2,332,010
CALIPERS
Filed July 15, 1942

INVENTOR:
Arthur Bradford Pike,
by Pike, Calver & Porter,
Attys.

Patented Oct. 19, 1943

2,332,010

UNITED STATES PATENT OFFICE 2,332,010

CALIPERS

Arthur Bradford Pike, Stoneham, Mass.

Application July 15, 1942, Serial No. 450,957

2 Claims. (Cl. 33—149)

The present invention relates to measuring calipers and embodies a plurality of features all of which are advantageous in calipers constructed for the special use contemplated while other features are advantageous in calipers constructed for general use.

It has been proposed to provide calipers for special uses wherein one arm carries a lever and a graduated scale arranged so the long arm of the lever may sweep over a graduated scale, the end of the short arm of the lever being urged outward by a spring to engage the surface of the work being measured. The means for adjusting the caliper arms included a spring acting to urge the caliper arms outward or away from one another and screw means acting in opposition to the spring to move the caliper arms toward one another. Such calipers could be adjusted and used to measure work of a predetermined dimension, the variation from the predetermined dimen being indicated directly upon the graduated scale. Calipers of this type were expensive to manufacture because of the great care and precision required in forming the short arm of the scale lever. They also were difficult to adjust and required considerable experience and skill to use.

The present invention contemplates specially the provision of calipers of the above special purpose type in which the above mentioned difficulties are eliminated. Thus, in accordance with the invention a screw is adjustably mounted in the short arm of the scale lever and its outer end serves as one of the work engaging portions of the calipers. Thus, precision work in forming the short arm of the scale lever is unnecessary because its desired effective length can be obtained and maintained by suitable adjustment of the adjustable screw. Positive means is provided for adjustably moving the caliper arms away from one another, such as a screw actuated toggle, in opposition to the action of a spring tending to move the caliper arms toward each other.

The use of calipers in measuring a work piece requires great skill and experience. The work engaging portions of both caliper arms must be accurately positioned at the ends of the true diameter. To accomplish this in measuring the inside diameter of a cylinder, for example, the operator must repeatedly readjust the caliper arms while feeling in two directions until the calipers are set at the smallest dimension at which both of its work engaging portions engage the work. That is, he must swing the calipers about two separate axes, one being an element of the cylinder and the other being parallel to a plane perpendicular to the axis of the cylinder.

In accordance with the present invention, the calipers are constructed so that it is only necessary to feel in one direction, for example, in measuring the inside diameter of a cylinder, by swinging the calipers about an element of the cylinder as an axis. This makes possible the use of the calipers by a less experienced operator without danger of obtaining an inaccurate measurement.

Figure 2:
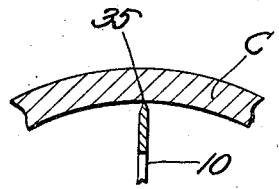

The invention will be more clearly understood from the following description in conjunction with the accompanying drawing, in which:

Fig. 1 is an elevational view of calipers embodying the invention engaging the inner wall of a cylinder, and Fig. 2 is a sectional view taken on the line 2—2 of Fig. 1.

One embodiment of the invention as illustrated in the drawing comprises calipers having a pair of caliper arms 10 and 11 pivotally mounted upon a common pivot pin 12. Links 13 and 14 are pivotally connected at one end to the caliper arms 10 and 11 respectively. The other ends of the links 13 and 14 are pivotally connected to a common pivot pin 15 thereby forming a toggle connecting the caliper arms 10 and 11. An adjusting rod 16 is secured at one end to the pivot pin 15 and projects through and slidably engages an opening 17 through the pivot pin 12. The free end of the rod 16 is threaded to receive an adjusting nut 18 adapted to abut the pivot pin 12. A spring is coiled about the pivot pin 12 and its free ends 20 and 21 are extended to engage the caliper arms 10 and 11 respectively.

The caliper arm 11 is provided with a lateral projection 22 to provide space for a scale S graduated to represent a desired measure, such as thousandths of an inch. A U-shaped wire 19 is secured at its ends to the caliper arm 11 to provide a guide slot of limited length. A lever 25 is pivotally mounted upon a stud 26 near the free end of the caliper arm 11 and has a long indicator arm 27 and a short arm 28. The indicator arm 27 projects under guide wire 19 and terminates adjacent the scale S. The short arm 28 is provided with a threaded opening to receive an adjustable screw 29 which may be locked in adjusted position by a lock nut 30. A spring 31 is coiled about the stud 26 and one end is extended to engage a stop 32 projecting from the caliper arm 11 and its other end is extended to engage the right hand edge of the arm 27 thereby tending to urge the lever 25 in a counterclockwise direction. The outer end 33 of the screw 29 serves as the work engaging portion of the caliper arm 11.

The caliper arm 10 is provided with a work engaging portion 35 in the form of a straight edge which may be a knife edge as illustrated. The screw 29 is so positioned that the distance from the work engaging portion 33 to the center $a$ of the pivot pin 12 is not greater than the length of the line $ab$ which is parallel to the knife edge 35 and perpendicular to the line $bc$ which is perpendicular to the knife edge from its outermost point $c$. The distance from the portion 33 to the center $a$ of the pin 12, preferably, should not be less than the distance from the center $a$ of the pin 12 to the innermost point $d$ of the knife edge. To obtain an accurate measurement, the work engaging portion 33 must be between the parallel lines $bc$ and $de$ or extensions thereof. When the distance from the center $a$ of the pin 12 to the work engaging portion 33 is within the above limits, the work engaging portion 33 will always lie between the parallel lines $bc$ and $de$ if means is provided to assure that the caliper arms cannot be spread so that the portion 33 will lie above the line $de$. This can be accomplished either by limiting the length of the links 13 and 14 or by stop 36 on the rod 16.

It will be noted that action of the spring portions 20 and 21 tends to swing the caliper arms 10 and 11 toward one another about the pivot pin 12. Thus, to adjust the position of the caliper arms, the nut 18 is turned either to straighten the toggle formed by the links 13 and 14 and spread the caliper arms 10 and 11 or to collapse the toggle and permit the spring portions 20 and 21 to swing the caliper arms toward one another. The specific form of calipers illustrated are particularly adaptable for use like a gauge, that is, to determine the variation of a work piece, from a predetermined desired dimension. Thus, if the work piece, such as a cylinder C, is intended to have an inside diameter of 2 inches, the calipers are adjusted so that the work engaging portions 33 and 35 are exactly 2 inches apart when the indicator arm 27 is opposite the zero graduation of the scale S. When the calipers are thus set to a predetermined desired dimension, they are placed within the cylinder as illustrated in Fig. 1, with the knife edge 35 engaging an element of the cylinder. The calipers are then moved about that element as an axis until the longest dimension is indicated upon the scale S. Thus, the position of the indicator arm 27 opposite the scale S indicates directly the exact difference in dimension of the inside diameter of the cylinder.

I claim:

1. Calipers comprising a pair of arms secured together at one end by a pivot pin, and means for adjusting said arms toward and away from one another about said pivot pin, the other end of each of said arms having a work engaging portion, one of said portions being a straight edge, the distance from the other of said work engaging portions to the center of said pivot pin being not greater than the distance from said center along a line parallel to said straight edge to the intersection of said line with a line perpendicular to said straight edge at its outermost point nor less than the distance from said center to the innermost point of said knife edge.

2. Calipers comprising a pair of arms secured together at one end by a pivot pin, means for adjusting said arms toward and away from one another about said pivot pin, the other end of each of said arms having a work engaging portion, one of said portions being a straight edge, the distance from the other of said work engaging portions to the center of said pivot pin being not greater than the distance from said center along a line parallel to said straight edge to the intersection of said line with a line perpendicular to said straight edge at its outermost point nor less than the distance from said center to the innermost point of said straight edge, and means for limiting the extent to which said caliper arms may be moved away from one another so that said other work engaging portion may always lie between lines perpendicular to said straight edge at its extremities.

ARTHUR BRADFORD PIKE.